(12) United States Patent
Gonzaga (10) Patent No.: US 7,341,090 B2
(45) Date of Patent: Mar. 11, 2008

(54) ASSEMBLING-DISASSEMBLING MACHINE PROVIDED WITH A OVERTURNABLE MOUNTING-DISMOUNTING TOOL

(75) Inventor: Tullio Gonzaga, Correggio (IT)

(73) Assignee: Butler Engineering & Marketing SpA, Rio Saliceto (IT)

( * ) Notice: Subject to any disclaimer, the term of this patent is extended or adjusted under 35 U.S.C. 154(b) by 0 days.

(21) Appl. No.: 11/398,984

(22) Filed: Apr. 5, 2006

(65) Prior Publication Data

US 2007/0000617 A1  Jan. 4, 2007

(30) Foreign Application Priority Data

Apr. 7, 2005  (IT) .......................... VR2005A0043

(51) Int. Cl.
  *B60C 25/132* (2006.01)
  *B60C 25/01* (2006.01)
(52) U.S. Cl. ..................................... 157/1.17; 157/1.24
(58) Field of Classification Search ............... 157/1.17, 157/1.22, 1.24, 1.28, 1.1
  See application file for complete search history.

(56) References Cited

U.S. PATENT DOCUMENTS

| | | | | |
|---|---|---|---|---|
| 4,209,053 A | * | 6/1980 | du Quesne | 157/1.24 |
| 4,694,875 A | * | 9/1987 | Goebel | 157/1.24 |
| 4,784,203 A | * | 11/1988 | Weiden | 157/1.24 |
| 4,884,611 A | * | 12/1989 | Schmidt | 157/1.24 |
| 5,226,465 A | * | 7/1993 | Schon et al. | 157/1.28 |
| 6,056,034 A | * | 5/2000 | Matnick | 157/1.24 |
| 6,109,327 A | | 8/2000 | Gonzaga | |
| 6,125,904 A | * | 10/2000 | Kane et al. | 157/1.24 |
| 6,182,736 B1 | * | 2/2001 | Cunningham et al. | 157/1.24 |
| 6,234,232 B1 | * | 5/2001 | Kane et al. | 157/1.24 |
| 6,276,423 B1 | * | 8/2001 | Goracy | 157/1.17 |
| 6,422,285 B1 | * | 7/2002 | Gonzaga | 157/1.24 |
| 6,588,478 B2 | * | 7/2003 | Vignoli | 157/1.28 |
| 6,629,554 B2 | * | 10/2003 | Mimura | 157/1.24 |
| 6,877,544 B2 | * | 4/2005 | Kane et al. | 157/1.24 |

FOREIGN PATENT DOCUMENTS

| | | |
|---|---|---|
| DE | 19627643 A1 | 1/1997 |
| EP | 0499825 A | 8/1992 |
| EP | 1366933 A | 12/2003 |

* cited by examiner

*Primary Examiner*—David B. Thomas
(74) *Attorney, Agent, or Firm*—Orum & Roth LLC (57) ABSTRACT

The present invention relates to an assembling-disassembling machine provided with a base, a rotating support device (4) for a wheel rim or tyred wheel, an upright or column element (2) extending upwards from the base, and at least one mounting/dismounting tool (6) supported by the upright or column element (2) and mounted on one end of a tool carrying arm (5) in order to transversely extend from the upright element (2). The assembling-disassembling machine also comprises rotating and shifting support means located between the upright or column element (2) and the tool-carrying arm (5) at an upper level with respect to the rotating support device (4), whereby said tool-carrying arm (5) can be rotated and shifted with respect to the upright or column element (2) between a working position, in which the tool (6) is close to the rotating support device (4) and at least one rest position far from the rotating support device (4).

16 Claims, 8 Drawing Sheets

Fig. 7

ASSEMBLING-DISASSEMBLING MACHINE PROVIDED WITH A OVERTURNABLE MOUNTING-DISMOUNTING TOOL

FIELD OF INVENTION

The present invention relates to an assembling-disassembling machine provided with a mounting-dismounting tool which can be displaced between a working position, in which it can be used to mount-dismount a tyre onto and from a wheel rim located on the assembling-disassembling machine, and a rest position which is far from the working position, whereby when the tool is in the rest position it is not an obstacle for other tyred-wheel maintenance operations. Assembling-disassembling machines comprising a base, a rotatable self-centring support group designed to support and hold in position a wheel rim, which is located on the support base, an upright extending generally upwards from the rear side of the support base, one or more working tools extending from the upright, have been proposed so far. To dismount a tyred wheel, the tyred wheel is located and blocked in position onto the rotatable self-centring support group, then a bead releasing step is carried out and a suitable mounting-dismounting tool is displaced from its rest to a working position in order to force it between tyre and wheel rim. The rotatable self-centring support group is then set in rotation in order to complete a tyre bead disassembling from or assembling into the wheel rim thus terminating a tyre dismounting or mounting operation. When the mounting/dismounting operations have been carried out, the working tool has to be moved away from its working position in which it could constitute an obstacle for subsequent maintenance operations, such as removing of a dismounted tyre or a wheel with a tyre mounted on it, and other maintenance operations.

BACKGROUND OF INVENTION

In order to move the tool from a working to a rest position thereof it has already been suggested to rotate the upright about its vertical axis thus causing an angular movement of the tool, or to incline the upright whereby partly rotating it about a horizontal axis, e.g. provided at base of the upright.

Accidents may occur when the upright is subjected to an angular movement, and thus a specific lateral protection is required about the upright which would unduly increase the production costs.

When the solution according to which the upright is inclined rearwards after having been partly rotated about a horizontal axis is adopted on an assembling-disassembling machine, a large area behind the machine is to be provided. In most cases such an area is not ready available without cost increase. Furthermore, according to such a solution in order to move the working tool between its working and rest positions a relatively large weight has to be displaced each time which might result in substantial unbalance in the machine. Moreover, with such a machine the times for tool "opening" are relatively long since the weight of the upright with its respective tool-carrying arm is heavy, and a slow opening is to be carried out in order to prevent the machine from being overturned.

Another drawback of such a tool system that provides for displacing the tool away from its working position is that the working area available for the operator (tyreman) to carry out other tyre disassembling from or mounting onto a wheel rim located on the self-centring group is limited even after upright has been (partly) overturned rearwards. Such a circumstance can be a penalizing factor for the operator's movements around and above the rotatable support group and accidents may occur owing to the presence of the tool hanging near the supporting group.

SUMMARY OF THE INVENTION

An object of the present invention is then to provide an assembling-disassembling machine provided with a mounting-dismounting tool displaceable between a rest and a working position, which tool in its rest position is outside the operator's working or intervention area without additional space other than the overall size of the assembling-disassembling machine being required.

Another object of the present invention is to provide an assembling-disassembling machine provided with a tool which can be moved away from and towards the rotatable support group with a minimal effort and without causing unbalance in the machine trim.

Another object of the present invention is to provide an assembling-disassembling machine which can rapidly and effectively change from a configuration in which its mounting-dismounting tool is located in a working position to a configuration with mounting/dismounting tool in a rest position with low efforts by the operator with respect to those required when dealing with conventional assembling-disassembling machines.

This and other objects are achieved by an assembling-disassembling machine provided with a base, a rotatable support device for a wheel rim or tyred wheel, an upright or column element extending upwards from said base, at least one mounting/dismounting tool supported by said upright or column element and mounted at an end of a tool-carrying arm to transversely extend with respect to said upright element, said machine being characterized in that it comprises rotating and sliding support means located between said upright or column element and said tool-carrying arm at an upper level with respect to said rotatable support device, whereby said tool-carrying arm can be shifted and angularly displaced with respect to said upright or column element between a working position, in which said tool is located close to said rotating support device and at least one rest position away from said rotatable support device.

BRIEF DESCRIPTION OF THE DRAWINGS

Further features and advantages of the present invention will become better apparent from the following detailed description of a number of presently preferred embodiments thereof, given by way of non-limiting examples of carrying out the invention, with reference to the accompanying drawings, in which.

DESCRIPTION OF THE PREFERRED EMBODIMENTS

In the accompanying drawings, the same or similar parts or components have been indicated with the same reference numerals.

Figure 1:
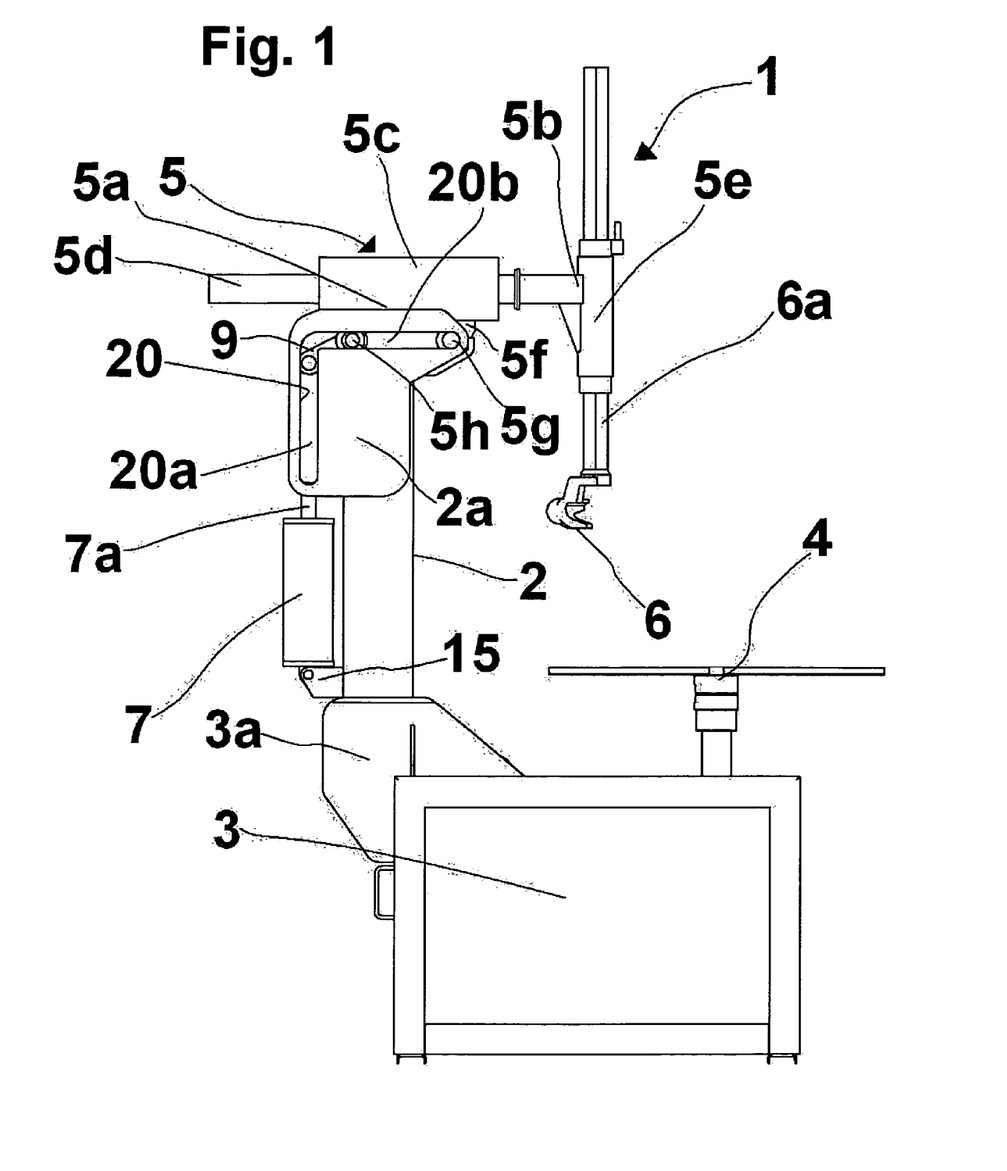
FIG. 1 is a side top view of an assembling-disassembling machine according to a first embodiment of the present invention.

With reference first to FIG. 1, there is illustrated an assembling-disassembling machine, generally designed with the reference numeral 1, comprising a vertical column or upright 2, supported by a base 3 from which a rotatable support device (table) 4 extends upwards and is designed to lock and set in rotation a motor vehicle wheel rim (not shown) about the axis of rotation of the wheel. More particularly, the column 2 can be advantageously supported by a rear lug 3a of the base 3.

One end 5a of a tool-carrying arm 5 is secured at the top of the column 2, and extends transversely thereto. The tool-carrying arm 5 at its other end 5b supports a sleeve 5e in which a tang 6a of a mounting-dismounting tool 6 can slide and be locked in position in any suitable way.

Constructively, the vertical column 2 can support at the top thereof one or preferably a pair of plates 2a (only one of which is shown) arranged on opposite sides with respect to column 2. The plates 2a extend parallel to each other and to the vertical axis of column 2 and are fixed, preferable welded, to column 2. A respective slot 20 is formed in each plate, each slot having a first lower section 20a, substantially parallel to the column 2, and an upper section 20b extending substantially crosswise, preferably at 90 degrees, with respect to the lower section 20a.

The tool-carrying arm 5 comprises a tubular element or sleeve 5c, preferably having an external diameter smaller than the distance between the plates 2a. The tubular element 5c, for example, bridges and is arranged parallel to the two plates 2a and extends transversely (preferably at 90 degrees) with respect to the longitudinal axis of column 2, in the same direction of the rotatable support device 4. An arm 5d is slidably mounted in the sleeve 5c, the arm 5d being longer than tubular element 5c. One end of the arm 5d extends outwards from the tubular element 5c, and supports the sleeve 5e, whereas its other end extends outwards from the tubular element 5c towards the rear of the machine.

With such an arrangement the arm 5d and thus the the tool 6 is telescopically extendable out of and retractable into the tubular element 5c.

Preferably, the tubular element 5c is supported at its lower section by means of one or a couple of plate elements or lugs 5f, which are fixed, preferably welded, to the tubular element 5c. A pair of through holes are formed in each plate element or lug 5f, through which a pair of parallel transverse pin members or constraint means extend, i.e. a forward or front pin 5g and a rear pin 5h that slidably engage in the slots 20 formed in the pair of sheets 2a at the ends thereof.

The unit comprising tool-carrying arm 5, sleeves 5c and 5e, arm 5d, tool 6 and sheet elements 5f constitutes a slide unit which can slide in the slots 20, the slots 20 also constituting a securing means for the slide group to the column 2.

One end of a fluid-operated group 7, preferably comprising a piston and cylinder unit or a pneumatic jack group, is anchored at the base of the column 2, and has a piston rod 7a at its other end articulated to a link or shackle member 9 that is pivoted to the pin 5h at its opposite end.

The operation of the above described assembling-disassembling machine is quite simple and effective.

When the mounting-dismounting tool 6 has to be displaced from a working position (FIG. 1) to a rest position away from the support device 4, the operator, e.g. by means of a pedal, not shown, controls the jack 7 whose stem 7a through interposition of shackle 9 causes the pin 5h first to slide along the horizontal section 20c of slots 20 and then downward along the vertical section 20d. Thus, the tool-carrying arm 5 is horizontally shifted thereby causing the tool 6 to withdraw with respect to support device. When the pin 5h then enters the vertical section 20d, the arm 5 and thus the mounting-dismounting tool starts a rearwards overturning movement.

By further moving the pin 5h downwards along the vertical section 20d of the slots 20 to reach the lower end thereof, the frontal pin 5g is caused to engage with the vertical section 20d, which causes a complete overturn, substantially at 90 degrees, of the tool-carrying arm 5 and tool 6 about the top of the column 2, thus the tool is moved to its rest position in which it is arranged almost parallel to the column 2 and the rod 6a is located above the column 2 in substantially horizontal trim, i.e. the tool-carrying arm is overturned through 90 degrees with respect to its working position.

Figure 2:
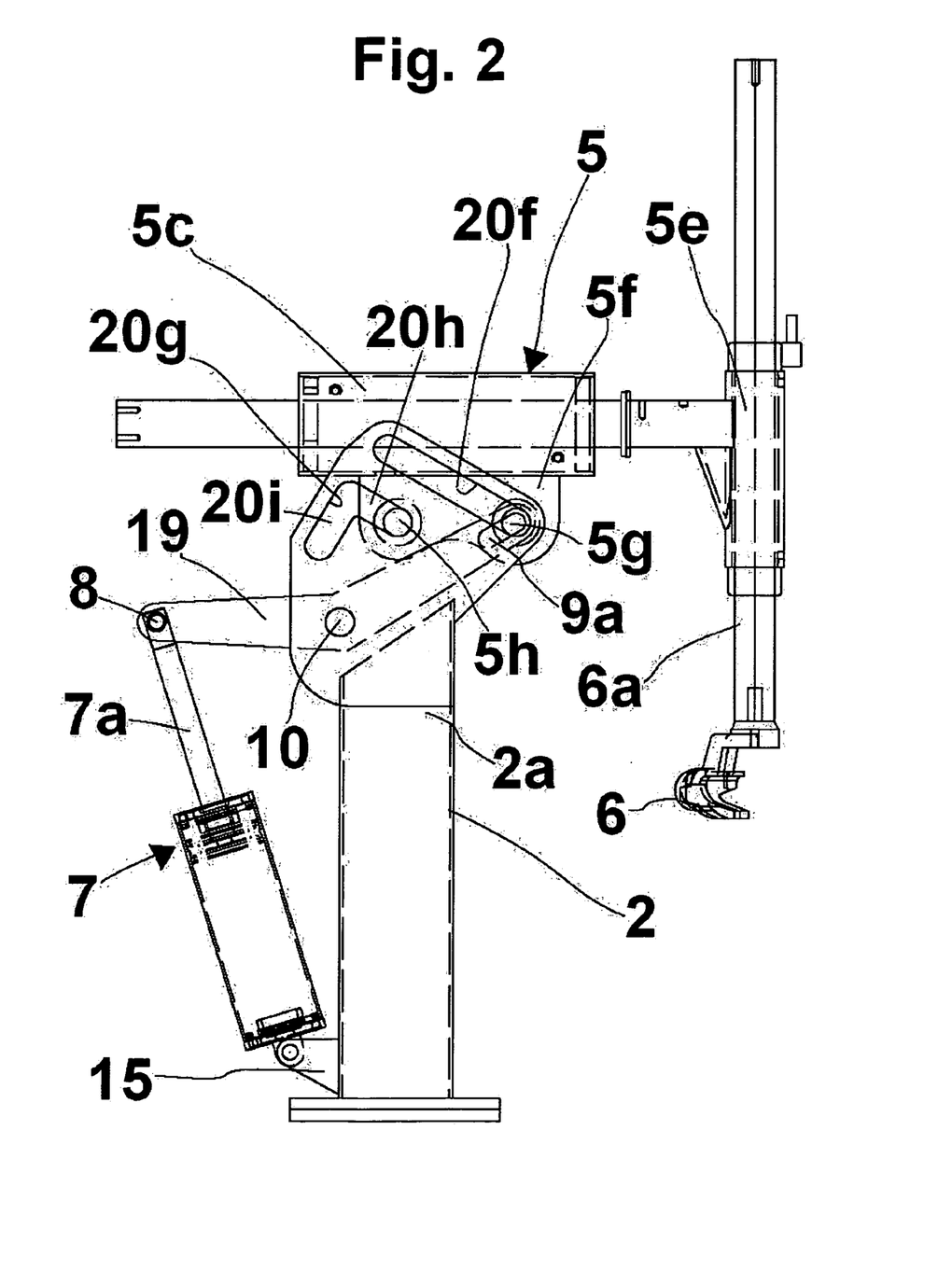
FIG. 2 is a side top view with transparent components of an assembling-disassembling machine according to another embodiment of the present invention provided with a mounting-dismounting tool in a working position.
Figure 3:
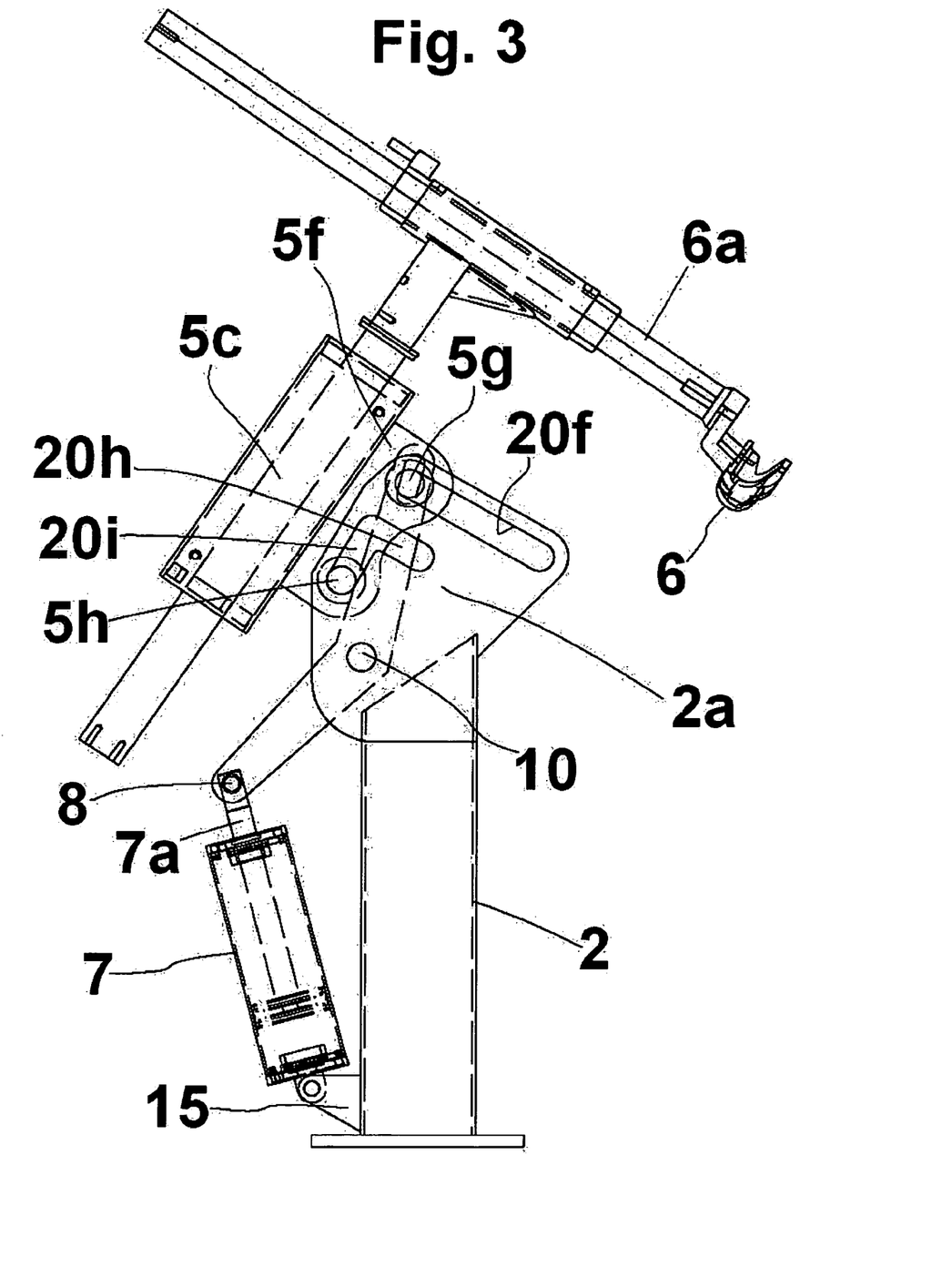
FIG. 3 shows the assembling-disassembling machine of FIG. 2 with its mounting-dismounting tool in a rest position.
Figure 4:
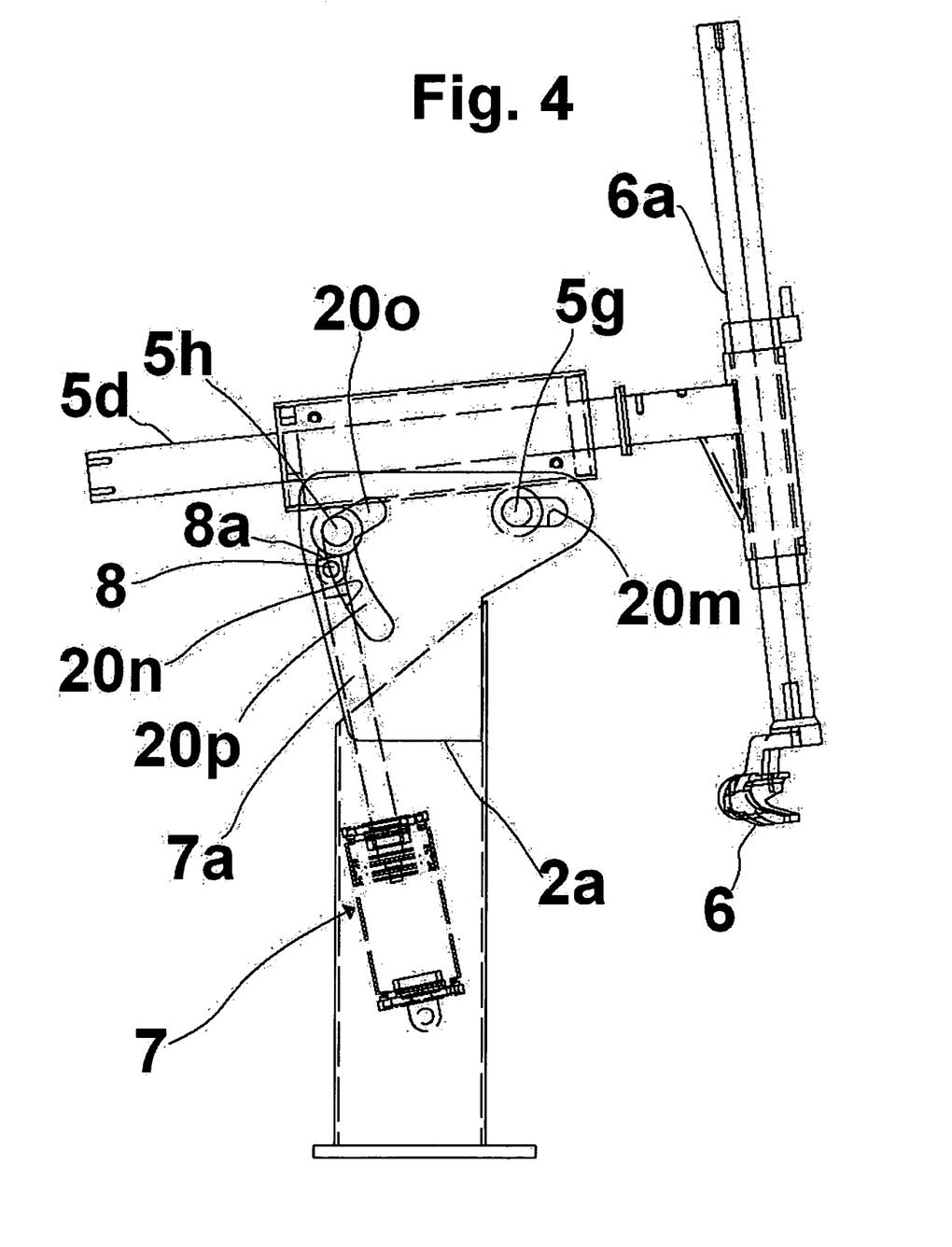
FIG. 4 shows the assembling-disassembling machine of FIG. 2 with its tool in a position intermediate between working and rest positions.

In FIGS. 2 to 4 there is illustrated another embodiment of the invention according to which a tool-carrying sleeve 5c and a tool 6 similar to those illustrated in FIG. 1 are provided, but two separated slots are formed in each twin plate 2a, i.e. a frontal slot 20f inclined with respect to the column 2 and extending downwards towards tool 6, and a rear L-shaped slot 20g having its concavity facing downwards and comprising a first section 20h extending substantially parallel to the slot 20f, but shorter than the slot 20f, and a second section 20i inclined at about 90 degrees with respect to section 20h.

Each of pin 5g and 5h extends throughout two plate elements 5f, and is slidably engaged in the slots 20f and 20g of the plates 2a, respectively. The mutual positioning of the slots 20f and 20g in each plate 2a is such that the lower end of the slots 20f is substantially at the same level as that of the lower end of section 20h of slots 20g, whereas the upper end of slots 20f is substantially aligned with the section 20i of the slots 20g. With such an arrangement, when the mounting/dismounting tool 6 is arranged in its working position, i.e. near the support device 4 and with its tang 6a extending in a substantially vertical direction (FIG. 2), the pin 5g is located at the lower end of frontal slots 20f and the pin 5h is disposed at the lower end of the section 20h parallel to frontal slot 20f. When, instead, the mounting/dismounting tool 6 has been displaced to a rest position, it is overturned above the column 2 and the sleeve 5c is arranged inclined and partly behind the column 2 (FIG. 3). When the tool is in a rest position, the pin 5g is located at the upper end of sloped slot 20f, and the pin 5h is located at the lower end of the second section 20i of L-shaped slot 20g. It will be noted that the slots are so dimensioned that the extension (length) of the inclined slot 20f is substantially equal to total length, i.e. the length obtained by adding together the length of the first section 20h and second section 20i of the L-shaped slot 20g.

Moreover, a shifting system for the pin 5g is provided which comprises a piston-cylinder group 7, the piston rod 7a of which is pivoted at the free end thereof at 8 to one end of an L-shaped lever 19 fulcrumed at an intermediate zone thereof to a hinge pin 10 which extends parallel to pin 5g, the lever 19 at its other end having slot 9a through which it is articulated to the pin 5g.

The mounting/dismounting tool 6 ran be moved from its working position (FIG. 2) to its rest position (FIG. 3) in a simply and rapid way.

When the mounting/dismounting tool 6 is in its working position, the pin 5g is located at the lower end of the inclined slot 20f and the pin 5h is arranged at the lower end of section 20h of slot 20g which is parallel to the inclined slot 20f. When the dismounting operations of a tyre from its respective wheel rim have been carried out, the working tool 6 has to be moved away from the support device in order to make it possible to definitively and with no hindrance remove the tyre from the wheel rim located on the support device 4. To this purpose, the pin 5g is shifted by means of the piston-cylinder group 7 through the lever 9. The pin 5g is caused to slidably shift along the inclined slot 20f and consequently the pin 5h is caused to be shifted along the first section 20h of the slot until it reaches the upper end thereof. Simultaneously, the tool 6 supported by the tool-carrying arm 5, i.e. by the pins 5g and 5h, is first displaced so as to approach column 2 and move away from the wheel rim, and then shifted upwards. When pin 5g has been shifted upwards through a length of about half the length of the slots 20f, the pin 5h is caused to enter the second section 20i of the L-shaped slot 20g, and thus the tool-carrying arm 5 is partly rotated and consequently starts to be overturned rearwards, and the tool 6 already previously moved away from the wheel rim or from the support device 4, is raised.

At this point, pin 5g is being displaced along the slots 20f until it reaches their upper ends, and on the other hand pin 5h is lowered along section 20i of the L-shaped slots 20g until it reaches their lower end, i.e. overturning rearwards to its rest position is completed, where the tool 6 is located away from the support device 4 and at a level higher than the top of the column 2 (FIG. 3).

To cause the tool to return from its rest position to a working position it is sufficient to energize the piston-cylinder group to cause it to extend so as to execute the above mentioned operations in reverse order.

Figure 5:
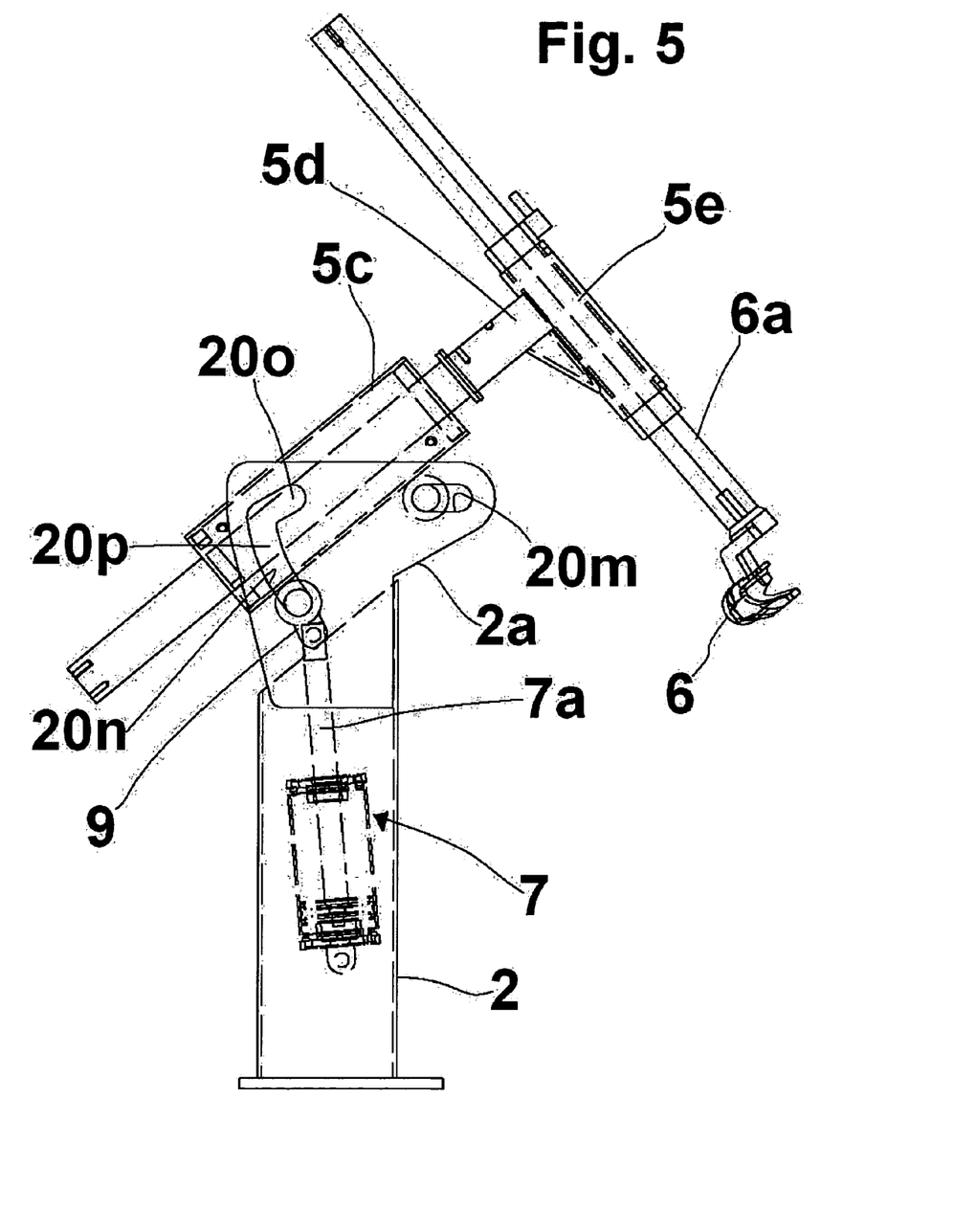
FIG. 5 shows the assembling-disassembling machine of FIG. 4 with its tool in a rest position.

The embodiment shown in FIGS. 4 and 5 is similar to the above described embodiments. A frontal slot 20m and a rear L-shaped slot 20n are formed in the plates 2a, the frontal slot 20m extending, in use, in a substantially horizontal direction, whereas the slot 20n comprises a first straight section 20o inclined rearwards, i.e. extending downwards and away from the horizontal slot 20m, and a second section 20p which is slightly curved with a concavity facing the front of the assembling-disassembling machine, i.e. the working tool 6.

The slots 20m and 20n are dimensioned and the pins 5g and 5h are positioned in such a way that when the tool 6 is in a working position, i.e. close to the support device 4, the pin 5g is positioned at the frontal end of the horizontal slot 20m, i.e. the end proximal to the tool 6, and the pin 5h is located at the upper end of the first section 20o of the L-shaped slots 20n, whereas when the frontal pin 5g has been shifted to the rear end of the slot 20m, far from the tool 6, the rear pin 5h is located at the upper end of the L-shaped slot 20n (FIG. 4).

For a correct operation of the tool approaching-removing system from or towards the working area according to this embodiment, the second section 20p of the L-shaped slot 20n has to be an arc of a circumference having its centre at the end of the frontal slot 20m. The piston-cylinder group 7 is articulated to the column 2 at a level lower than that of the plates 2a, and has its piston rod 7a articulated at 8 to one end of a shackle or L-shaped lever 19, the other end of which is pivoted to the pin 5h.

The tool 6 is moved away from its working position, i.e. the position in which the pin 5g is arranged at frontal end of the horizontal slot 20m and the pin 5h is located at the upper end of the first section 20o of the L-shaped slots 20n, by causing the pin 5h to be shifted downwards along the first section 20o of the L-shaped slots 20n and, correspondingly, the pin 5g will be moved along the horizontal slot 20m. These movements of the pins 5g and 5h correspond to a rear movement and partial rotation in counter-clockwise direction, when looking at the Figures, of the tool 6 until pin 5h reaches the end of the first section 20o and, correspondingly, pin 5g is shifted to the end of the horizontal slot 20m.

At this point, pin 5h is lowered along the slightly curved second section 20p of the L-shaped slot 20n, which causes a further angular displacement of the tool-carrying arm 5 and upward displacement of the tool 6 that is then moved to a rest position in an overturned and rear position as shown in FIG. 5.

Figure 6:
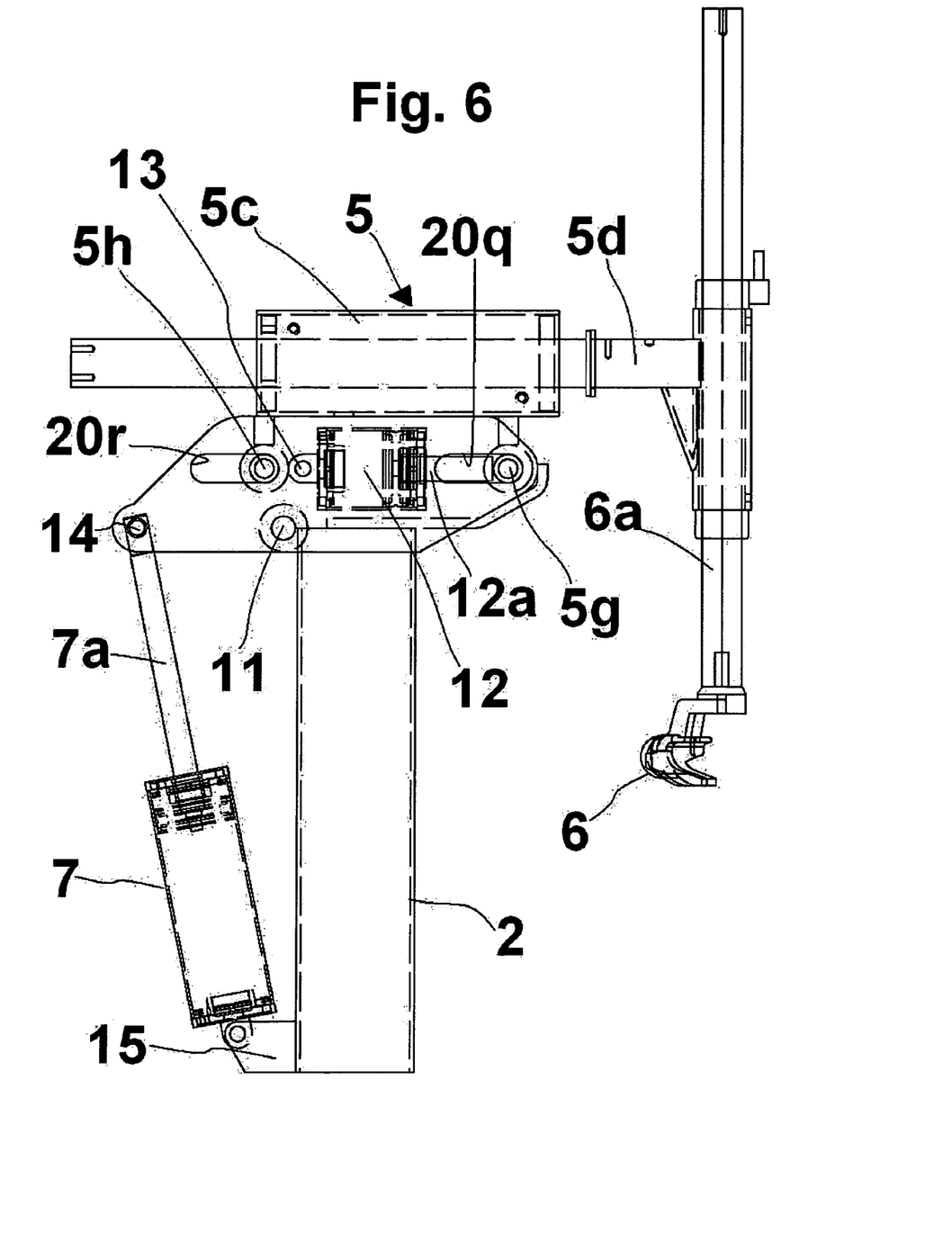
FIGS. 6 to 8 are views similar to FIG. 2 which show an assembling-disassembling machine according to another embodiment with mounting-dismounting tool in a working, intermediate and rest position, respectively.
Figure 7:
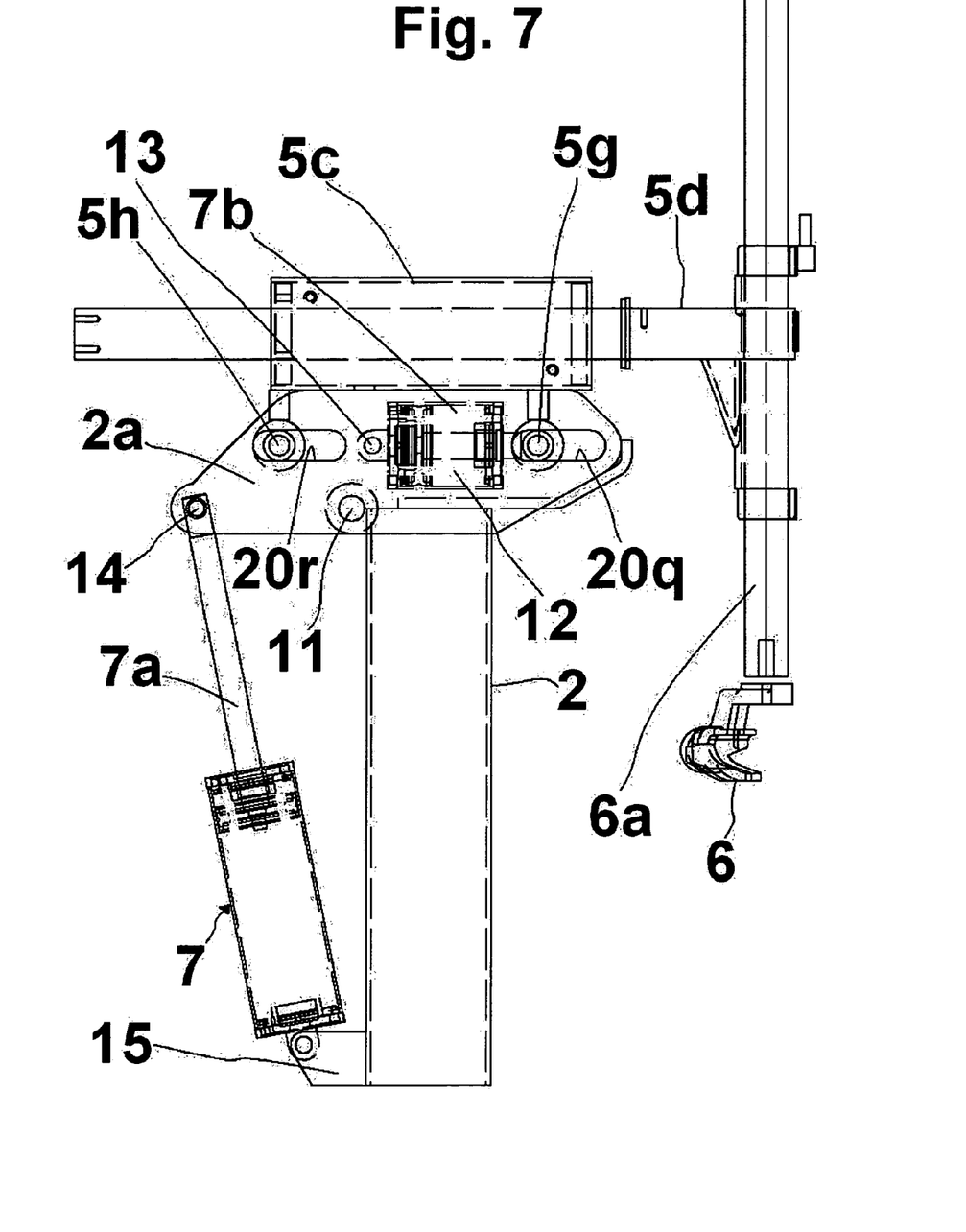
Figure 8:
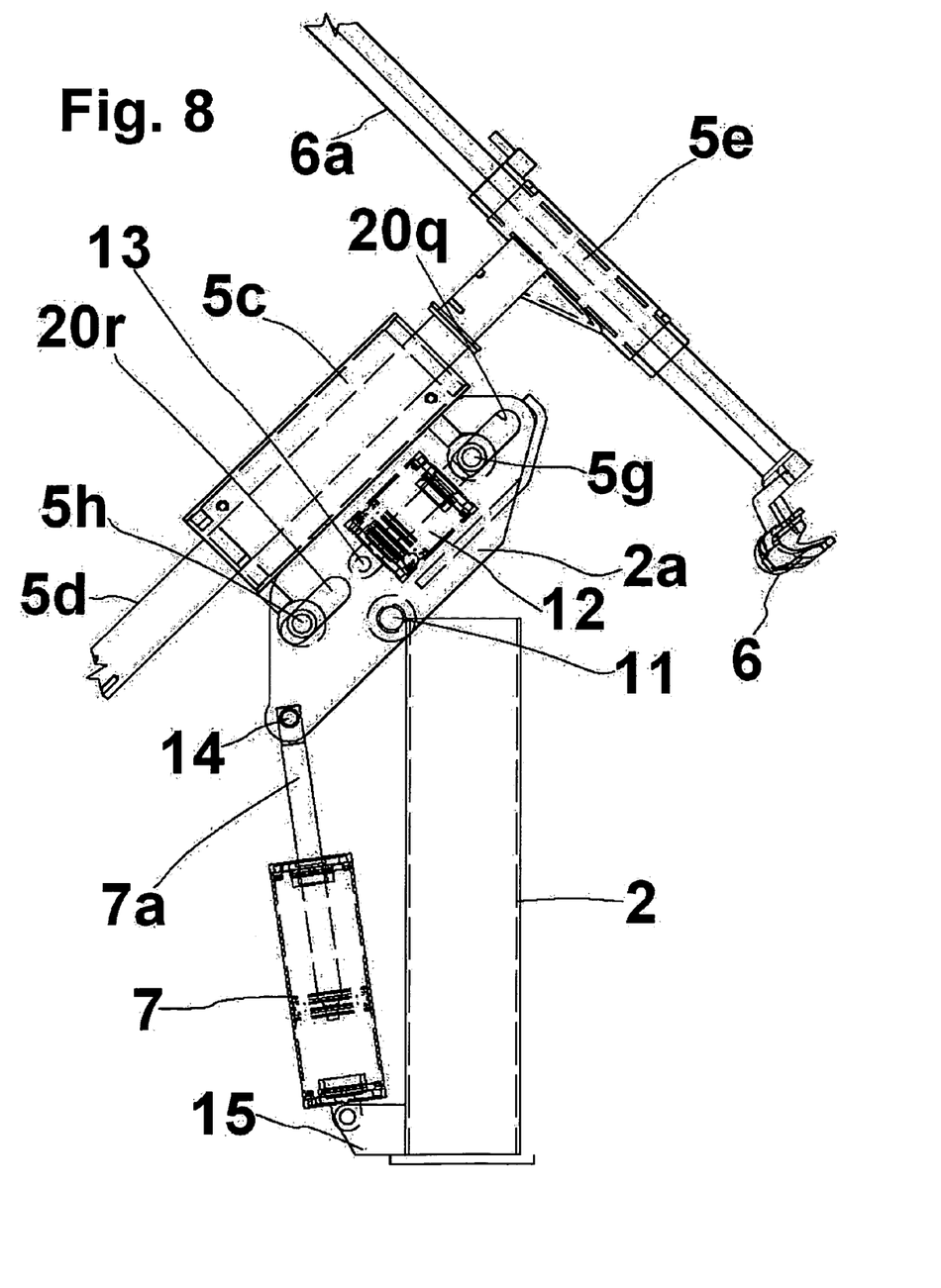

FIGS. 6 to 8 illustrate another embodiment of a system comprising a tool-carrying arm 5 and a tool 6 similar to those shown in FIGS. 2 to 5, but having different anchoring means to column 2, as well as a different control system for the tool-carrying arm 5 and thus for the tool 6. According to this embodiment, in fact, plates 2a are mounted for rotation about a horizontal pin 11, which is substantial parallel to pins 5g and 5h. Two mutually aligned horizontal slots, a frontal slot 20q and a rear slot 20r having the same length are formed in the plates 2a. The distance between pin 5g and pin 5h, which are supported by the vertical plate element 5f, is substantially equal to the distance between the centres of two horizontal slots 20q and 20r, and a double-acting piston-cylinder group 12 is located therebetween whose piston rod 12a is anchored to the pin 5g, whereas its cylinder is articulated at 13 to the plates 2a. The rear end of each plate 2a is articulated at 14 to the piston rod 7a of the cylinder-piston group 7, whose cylinder is anchored to a lower lug 15 of the column 2.

When one desires to move the tool 6 from the working position shown in FIGS. 6 and 7 to its rest position (FIG. 8), it is sufficient to energize the piston-cylinder group 12 by acting on suitable means, such as a pedal (not shown), whereby causing pins 5g, 5h to be horizontally displaced along their respective slots 20q and 20r in the approaching direction of the tool 6 to the column 2 until the pins reach the rear end of their respective horizontal slot.

At this point, the piston-cylinder group 7 is actuated and by being retracted causes the plates 2a to be angularly displaced about the horizontal pin 11 and thus the tool-carrying arm 5 and the tool 6 to be overturned to their rest position shown in FIG. 8.

According to this embodiment backward movement (displacement) of the tool from its working position and overturning (rotation) of the tool to a rest position are separately automated, which is a solution that differs from the above described embodiments according to which only one actuator is provided.

An assembling-disassembling machine described as above ensures a large zone clear of hindrance around the support device 4, once the mounting-dismounting tool has been displaced away to its rest position as described above. After tool displacement the operator can remove the wheel with a tyre mounted on it and inflated from the support device 4 and/or can locate a wheel rim onto the support device 4 onto which tyre has to be mounted or a tyred wheel from which a tyre has to be disassembled. The solution of locating the displacement system for the tool on the top of the column 2 or, however, at a column part located at a level higher than that of the support device 4, differs from conventional systems according to which the overturn movement occurs at the column base and makes it possible for the tool to be raised to a substantial extent as the tool is caused to rotate about a centre of zone of rotation located much higher than support device 4 even without requiring a specific free area at the rear of the assembling-disassembling machine as was the case with conventional collapsible column machines.

Moreover, the mass or weight which is moved to displace the tool 6 between its working position and a rest position in a machine according to the present invention is much lower than that involved in conventional assembling-disassembling machines. As a matter of fact, in conventional machines besides the tool-carrying arm and the tool also the whole column has to be angularly dislocated. Accordingly, to displace the mounting-dismounting tool in an assembling-disassembling machine according to the present invention a much lower effort is required than with a conventional machine, and this results in power saving and a reduction in possible overturn of the machine.

The assembling-disassembling machine as described above is susceptible to numerous modifications and variations within the scope as defined by the claims.

The invention claimed is:

1. An assembling-disassembling machine provided with a base, a rotatable support device for a wheel rim or tyred wheel, an upright or column element extending from said base upwards, and at least one mounting/dismounting tool supported by said upright or column element and mounted on one end of a carrying-tool arm so as to transversely extend from said upright element, said machine comprising rotating and shifting supporting means located between said upright or column element and said tool-carrying arm at a level higher than said rotatable support device, whereby said tool-carrying arm can be shifted and angularly displaced with respect to said upright or column element between a working position, in which said tool is close to said rotating support device and at least one rest position, in which said tool is at least partly overturned and far from said rotatable support device.

2. A machine as claimed in claim 1, wherein said rotating and shifting supporting means comprises actuating means.

3. A machine as claimed in claim 2, wherein said actuating means comprises a linear actuator.

4. A machine as claimed in claim 1, wherein said rotating and shifting supporting means comprises actuating means and said machine comprises at least one coupling lug member integral with said tool-carrying arm, at least one coupling plate element supported by said column, a guide path formed in said coupling plate element, at least one constraint means between said at least one lug member and said at least one coupling plate element, said constraint means being designed to slidably engage with said guide path in order to displace said tool-carrying arm between at least one working position and at least one rest position, at least one of said constraint means being operatively linked to said actuating means.

5. A machine as claimed in claim 4, wherein said constraint means comprises at least one pin member and said at least one guide path comprises at least one slot, each slot comprising two sections mutually inclined with respect to one another and being slidably engageable by said at least one pin member.

6. A machine as claimed in claim 5, wherein said actuating means comprises a piston-cylinder group having one end thereof articulated to said base and its other end which is articulated to a shackle or link member, said shackle or link member being articulated to a respective pin member.

7. A machine as claimed in claim 4, wherein said at least one guide path comprises at least one frontal slot and at least one rear slot, each slot being slidably engageable by a respective constraint means.

8. A machine as claimed in claim 4, wherein said at least one guide path comprises at least one frontal slot and at least one rear slot, each slot being slidably engageable by a respective constraint means, and said frontal slot comprises a straight section which is inclined with respect to said column, and said rear slot comprises a first section and a second section, said first and second sections being arranged mutually inclined one after the other.

9. A machine as claimed in claim 8, wherein said first section is parallel to said inclined straight section and said second section extends transversely with respect to said first section.

10. A machine as claimed in claim 8, wherein said actuating means comprises a piston-cylinder group having one end thereof articulated to said base and its other end articulated to one end of an L-shaped lever element which has one end thereof fulcrumed on said column or on said at least one coupling plate element and its other end articulated to a respective constraint means, said constraint means being slidably engaged by said at least one frontal slot.

11. A machine as claimed in claim 4, wherein said at least one guide path comprises at least one frontal slot and at least one rear slot, each slot being slidably engageable by a respective constraint means, and said at least one frontal slot extends in a horizontal direction and said at least one rear slot comprises a first section transversely extending with respect to said at least one frontal slot and a second section close to said first section, said second section being curved with centre of curvature located in said at least one frontal slot.

12. A machine as claimed in claim 11, wherein said actuating means comprises a piston-cylinder group having one end thereof articulated in said column and its other end articulated to a shackle or link member, said shackle or link member being articulated to a respective constraint means.

13. A machine as claimed in claim 4, wherein said at least one guide path comprises at least one frontal slot and at least one rear slot, each slot being slidably engageable by a respective constraint means, and said at least one frontal slot is aligned with said rear slot or couple slots in a direction substantially parallel to said tool-carrying arm, said at least one sheet element is pivoted about an horizontal pin parallel to said constraint means, and said actuating means comprises a piston-cylinder group having one end thereof articulated to said base or to said column base and its other end articulated to said at least one plate element about a pin relatively far away from said horizontal pin.

14. A machine as claimed in claim 13, comprising a linear actuator having one end thereof anchored to said at least one plate element and its other end anchored to said at least one constraint means.

15. A method for mounting-dismounting a tired wheel by means of a machine, comprising the steps of:

arranging a wheel rim on or from which a tire is to be mounted or dismounted, respectively, on a rotatable support device of the machine, lowering at least one mounting/dismounting tool mounted on one end of a carrying-tool arm supported by an upright or column element of the machine and transversely extending therefrom, thereby causing one bead of the tire to be removed from, or inserted onto, the wheel rim, upon rotating said rotatable support device, and lifting said mounting-dismounting tool, thereby causing said tool-carrying arm to be angularly displaced upwards and backwards with respect to said rotatable support device to be overturned and moved away from working area around and above said support device.

16. A method as claimed in claim 15, wherein the tool-carrying arm is caused to be angularly displaced upwards and backwards of about 90 degrees.

* * * * *